(12) United States Patent
Watanabe et al.

(10) Patent No.: US 9,783,237 B2
(45) Date of Patent: Oct. 10, 2017

(54) VEHICLE FRONT SECTION STRUCTURE

(71) Applicants: TOYOTA JIDOSHA KABUSHIKI KAISHA, Toyota-shi, Aichi-ken (JP); AISIN TAKAOKA CO., LTD., Toyota-shi, Aichi (JP)

(72) Inventors: Ryosuke Watanabe, Toyota (JP); Tatsuya Komamura, Toyota (JP); Yasunori Iwamoto, Toyota (JP); Ikuto Hirai, Nagakute (JP)

(73) Assignees: TOYOTA JIDOSHA KABUSHIKI KAISHA, Toyota (JP); AISIN TAKAOKA CO., LTD., Toyota (JP)

( * ) Notice: Subject to any disclaimer, the term of this patent is extended or adjusted under 35 U.S.C. 154(b) by 0 days.

(21) Appl. No.: 15/211,687

(22) Filed: Jul. 15, 2016

(65) Prior Publication Data

US 2017/0021868 A1 Jan. 26, 2017

(30) Foreign Application Priority Data

Jul. 22, 2015 (JP) ................................ 2015-145001

(51) Int. Cl.
| | | |
|---|---|---|
| *B60R 19/34* | (2006.01) | |
| *B62D 21/15* | (2006.01) | |
| *B62D 25/08* | (2006.01) | |

(52) U.S. Cl.
CPC ............ *B62D 21/152* (2013.01); *B60R 19/34* (2013.01); *B62D 25/082* (2013.01)

(58) Field of Classification Search
CPC ...... B62D 21/15; B62D 21/152; B62D 25/08; B62D 25/082; B60R 19/34; B60R 19/02

USPC .......................... 296/187.09, 187.1; 293/133
See application file for complete search history.

(56) References Cited

U.S. PATENT DOCUMENTS

| | | | | |
|---|---|---|---|---|
| 4,031,978 A | * | 6/1977 | Taylor | ..................... B60R 19/26 180/232 |
| 8,002,338 B2 | * | 8/2011 | Yasuhara | ............. B62D 21/152 293/133 |
| 8,210,601 B2 | * | 7/2012 | Terada | .................... B60R 19/34 293/133 |

(Continued)

FOREIGN PATENT DOCUMENTS

| | | |
|---|---|---|
| JP | 2012-030721 A | 2/2012 |
| JP | 2014-121955 A | 7/2014 |

(Continued)

*Primary Examiner* — Gregory Blankenship
(74) *Attorney, Agent, or Firm* — Oliff PLC (57) ABSTRACT

A vehicle front section structure includes a front side member, a gusset that juts out from a side face of a front end of the front side member, a bumper reinforcement that is disposed at a front end side of the vehicle body front section, and a crash box that is disposed between front ends of the front side member and the gusset, and an outer side section of the bumper reinforcement, that couples both of the front ends and the outer side section together, and undergoes compressive plastic deformation due to collision load. A flat portion is integrally formed at an end of the bumper reinforcement, with a front face of the flat portion extending along the vehicle width direction and a vehicle up-down direction and, in vehicle front view, overlapping with a side wall portion at the vehicle width direction outer side of the crash box.

3 Claims, 6 Drawing Sheets

(56) References Cited

U.S. PATENT DOCUMENTS

| | | | | |
|---|---|---|---|---|
| 8,608,231 B1* | 12/2013 | Mendivil | ................ | B60R 19/34 |
| | | | | 293/133 |
| 8,807,632 B2* | 8/2014 | Ramoutar | ................ | B60R 19/24 |
| | | | | 293/132 |
| 2007/0040398 A1* | 2/2007 | Lutke-Bexten | ......... | B60R 19/18 |
| | | | | 293/102 |
| 2012/0025546 A1* | 2/2012 | Haneda | ................ | B21D 39/032 |
| | | | | 293/132 |
| 2013/0001963 A1 | 1/2013 | Haneda et al. | | |
| 2014/0091585 A1* | 4/2014 | Ramoutar | ................ | B60R 19/24 |
| | | | | 293/133 |
| 2014/0367982 A1 | 12/2014 | Kano et al. | | |
| 2015/0069785 A1* | 3/2015 | Sakakibara | .......... | B62D 25/085 |
| | | | | 296/187.1 |
| 2015/0084375 A1* | 3/2015 | Asano | .................... | B62D 21/11 |
| | | | | 296/187.09 |
| 2015/0239502 A1* | 8/2015 | Marten | ................. | B62D 21/02 |
| | | | | 296/204 |
| 2016/0121932 A1* | 5/2016 | Suzuki | ................. | B62D 21/152 |
| | | | | 296/187.09 |
| 2016/0280272 A1* | 9/2016 | Haga | ..................... | B62D 27/023 |
| 2016/0332588 A1* | 11/2016 | Watanabe | ................ | B60R 19/24 |
| 2017/0021868 A1* | 1/2017 | Watanabe | ............ | B62D 21/152 |
| 2017/0050598 A1* | 2/2017 | Taguchi | .................. | B60R 19/42 |

FOREIGN PATENT DOCUMENTS

| | | |
|---|---|---|
| JP | 2015-054589 A | 3/2015 |
| JP | 2015-054591 A | 3/2015 |
| WO | 2011/059024 | 5/2011 |
| WO | 2013/088765 | 6/2013 |

\* cited by examiner

VEHICLE FRONT SECTION STRUCTURE

CROSS-REFERENCE TO RELATED APPLICATION

This application is based on and claims priority under 35 USC 119 from Japanese Patent Application No. 2015-145001 filed on Jul. 22, 2015, the disclosure of which is incorporated by reference herein.

BACKGROUND

Technical Field

The present disclosure relates to a vehicle front section structure.

Related Art

Japanese Patent Application Laid-Open (JP-A) No. 2015-054591 describes technology related to a vehicle front section structure. In this related art, configuration is described in which a gusset (a coupling member) of trapezoidal shape in plan view is attached to a side face at a vehicle width direction outer side of a front end portion of a front side member, and a crash box is also provided spanning both the front end portion of the front side member and a front end portion of the gusset. Note that a front end section of the crash box is fixed to a rear wall section of bumper reinforcement configured by a hollow, rectangular cross-section profile.

In the above configuration, in cases in which collision load is input to the vehicle width direction outer side of the front side member in a front-on collision mode, (hereafter referred to as "small overlap collision"), the crash box absorbs collision energy by being crushed in the axial direction (vehicle front-rear direction). The front side member undergoes folding deformation (hereafter referred to as "inward folding", as appropriate) toward the vehicle width direction inner side due to the collision load being input to the side face in the vehicle width direction of the front side member. As a result, the front side member that has folded inward contacts a power unit, generating lateral force on the vehicle toward the vehicle width direction inner side (the opposite side to a collision), enabling the vehicle to be moved away from the barrier (collision body).

However, in the related technology described above, a front face of a vehicle width direction outer side end portion of the bumper reinforcement is configured by an inclined face that is gently inclined. Thus collision load is input to the end portion at the vehicle width direction outer side of the bumper reinforcement, obliquely toward the vehicle rear inner side. When a load component towards the vehicle width direction increases in the input load, the crash box collapses inward toward the vehicle width direction inner side, and it is conceivable that the front side member slips past the barrier (to the vehicle width direction inner side of the barrier). In the related technology described above, there is accordingly room for improvement regarding this point.

In consideration to the above, it is also conceivable to provide, at the front face of the vehicle width direction outer side end portion of the bumper reinforcement, a gusset configured as a different component from the bumper reinforcement and having a flat face along the vehicle width direction as a contact face with the barrier. However, in such a configuration, collision load is transmitted from the gusset configured as a different component to the crash box through the end portion at the vehicle width direction outer side of the bumper reinforcement. The load transmission path is thereby more complicated, and sufficiently quick and efficient load transmission cannot be achieved.

In consideration of the above, an object of the present invention is to provide a vehicle front section structure that is capable of transmitting collision load quickly and efficiently to a gusset, and that prevents a front side member from slipping past a barrier due to inward collapse of a crash box, enabling the front side member to be made to fold inward at an early stage in a small overlap collision.

SUMMARY

A vehicle front section structure according to a first aspect includes: a front side member that is disposed at a vehicle width direction outer side of a vehicle body front section, and that extends with its length direction in a vehicle front-rear direction; a gusset that juts out from a side face at a vehicle width direction outer side of a front end portion of the front side member toward the vehicle width direction outer side; a bumper reinforcement that is disposed at a front end side of the vehicle body front section with its length direction in a vehicle width direction; and a crash box that is disposed between front end portions of both the front side member and the gusset, and an outer side section in the vehicle width direction of the bumper reinforcement, that couples both of the front end portions and the outer side section together in the vehicle front-rear direction, and that has a tube shape which undergoes compressive plastic deformation in the vehicle front-rear direction due to collision load input toward a vehicle rear side, a flat portion being integrally formed at an end section of the bumper reinforcement at the vehicle width direction outer side, with a front face of the flat portion extending along the vehicle width direction and a vehicle up-down direction and, in vehicle front view, overlapping with a side wall portion at the vehicle width direction outer side of the crash box.

According to the first aspect, collision load from a barrier during a small overlap collision is input to the end portion at the vehicle width direction outside of the bumper reinforcement.

In the present aspect, the flat portion is formed to the end portion at the vehicle width direction outer side of the bumper reinforcement, with a front face of the flat portion extending along the vehicle width direction and a vehicle up-down direction. Most of the collision load from a barrier is thereby input to the flat portion straight toward the vehicle front-rear direction rear side, and then also input to the crash box straight toward the vehicle front-rear direction rear side. As a result, the crash box undergoes compressive plastic deformation in the vehicle front-rear direction and absorbs a specific amount of energy.

Namely, supposing that the front face at the vehicle width direction outer side end section of the bumper reinforcement were curved in a shape bowing toward the vehicle front side, the collision load from a barrier would be input obliquely toward the vehicle rear inner side, and not toward the vehicle front-rear direction rear side. In such cases, it is conceivable that partway through collapsing, the crash box might collapse inward toward the vehicle width direction inner side. However, the present invention is provided with the flat portion configured as described above, such that the load input direction is more toward the vehicle front-rear direction, and the crash box is less liable to collapse inward partway through collapsing. As a result, input force on the gusset during a small overlap collision can be raised at an early stage.

Moreover, due to the flat portion being integrally formed to the end portion at the vehicle width direction outer side of the bumper reinforcement, the number of components is not increased. The load transmission path of the collision load is therefore not made more complicated than when the flat portion is set as a different component, and the collision load can be quickly and efficiently transmitted to the gusset.

A vehicle front section structure according to the second aspect is the first aspect, wherein a first curved portion is formed at the outer side section in the vehicle width direction of the bumper reinforcement, further to a vehicle width direction inner side than the flat portion in vehicle plan view, with a front face of the first curved portion curved in a shape bowing toward a vehicle front side on progression toward a central section of the bumper reinforcement.

According to the second aspect, the first curved portion is formed at the outer side section in the vehicle width direction of the bumper reinforcement, further to a vehicle width direction inner side than the flat portion in vehicle plan view. The front face of the first curved portion is curved in a shape bowing toward a vehicle front side on progression toward a central section of the bumper reinforcement, such that the central section of the bumper reinforcement is disposed (placed forward) toward the vehicle front-rear direction front side by the amount by which the first curved portion is curved.

In a full overlap front-on collision (in a head-on collision) the crush stroke (namely, the distance from the front face of the central section of the bumper reinforcement to as far as a rear end face of the crash box) can thereby be lengthened. Namely, by forming the first curved portion, the front face of the central section of the bumper reinforcement contacts the barrier at an earlier timing in a full overlap front-on collision by the amount by which the central section of the bumper reinforcement is disposed further toward the vehicle front side. The crash box begins to undergo compressive plastic deformation from the point in time at which the barrier has contacted the front face of the central section of the bumper reinforcement.

A vehicle front section structure according to a third aspect is the vehicle front section structure of the second aspect, wherein the first curved portion is disposed at the outer side section in the vehicle width direction of the bumper reinforcement, separated from the flat portion to the vehicle width direction inner side. A second curved portion is disposed at the outer side section in the vehicle width direction of the bumper reinforcement, between the flat portion and the first curved portion in vehicle plan view, and connecting the flat portion and the first curved portion together, with a front face of the second curved portion curved in a shape bowing substantially toward the vehicle rear side so as to lie on an extension line of the front face of the flat portion toward the vehicle width direction inner side or at a vehicle front side of the extension line.

According to the third aspect, due to the second curved portion, which is curved in a shape bowing substantially toward the vehicle rear side, being disposed between the flat portion and the first curved portion and connecting the flat portion and the first curved portion together, forward placement of the central section of the bumper reinforcement can be achieved to the maximum extent by using the first curved portion, while avoiding contact with an end section of the barrier in the vehicle width direction as much as possible at the collision start time in a small overlap collision. Accordingly, more of the collision load is input from the barrier toward the flat portion, and the longer crush stroke described above can be secured as much as possible.

A vehicle front section structure according to a fourth aspect is the vehicle front section structure of the second aspect or the third aspect, wherein the crash box is disposed overlapping both the flat portion and the first curved portion in vehicle front view, and a front end section of the crash box has a shape following the flat portion and the first curved portion.

According to the fourth aspect, the crash box is disposed overlapping with both the flat portion and the first curved portion in vehicle front view. The front end section of the crash box has a shape following the flat portion at the outer side section in the vehicle width direction of the bumper reinforcement and the first curved portion. At least an inner side portion in the vehicle width direction of the crash box thereby extends toward the vehicle front side.

A vehicle front section structure according to a fifth aspect is the vehicle front section structure of the fourth aspect, wherein the bumper reinforcement is provided with a front end wall, an upper wall, and a lower wall, and is formed with an open cross-section profile open to the vehicle rear side. The front end section of the crash box is inserted into the interior of the cross-section of the bumper reinforcement, and the front end section of the crash box has a shape following a front end wall of the flat portion and first curved portion.

According to the fifth aspect, the bumper reinforcement is formed with an open cross-section profile open to the vehicle rear side, and the front end section of the crash box is inserted into the cross-section of the bumper reinforcement. The front end section of the crash box has a shape running along the front end wall of the flat portion and the first curved portion, such that the length of the crash box in the vehicle front-rear direction is lengthened by the amount that the crash box has been inserted.

As explained above, the vehicle front section structure according to the first aspect has the excellent advantageous effects of transmitting collision load quickly and efficiently to the gusset and preventing the front side member from slipping past a barrier due to inward collapsing of the crash box, and moreover enabling the front side member to be folded inward at an early stage in a small overlap collision.

The vehicle front section structure according to the second aspect has the excellent advantageous effect of enabling the crash box to absorb energy quickly in a full overlap front-on collision.

The vehicle front section structure according to the third aspect has the excellent advantageous effects of enabling an increase in the amount of load input from a barrier to the flat portion in a small overlap collision and causing the front side member to fold inward at an early stage, and further improving energy absorption performance in a full overlap front-on collision.

The vehicle front section structure according to the fourth aspect has the excellent advantageous effect of enabling an increase in the amount of energy absorbed by the crash box during a front-on collision.

The vehicle front section structure according to the fifth aspect has the excellent advantageous effect of enabling a further increase in the amount of energy absorbed by the crash box.

BRIEF DESCRIPTION OF THE DRAWINGS

Exemplary embodiments of the present invention will be described in detail based on the following figures, wherein.

DETAILED DESCRIPTION

Explanation follows regarding a vehicle front section structure according to an exemplary embodiment of the present aspect, with reference to FIG. 1 to FIG. 6B. Note that in the drawings, the arrow FR, the arrow UP, and the arrow IN respectively indicate the vehicle front side, the vehicle upper side, and the vehicle width direction inner side, as appropriate.

Overall Configuration of the Vehicle Front Section Structure

Figure 1:
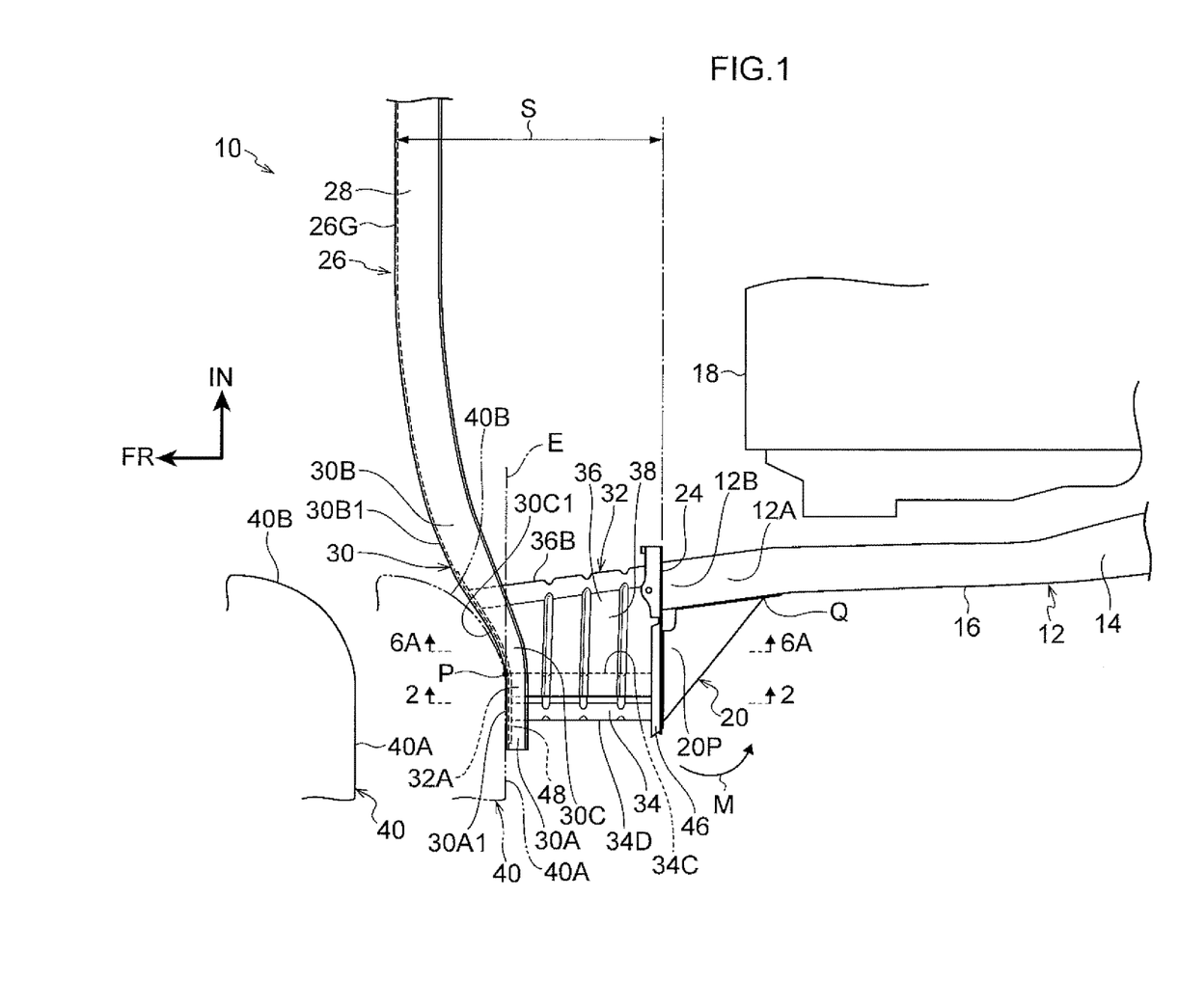
FIG. 1 is an enlarged plan view illustrating relevant portions of a vehicle front section structure according to an exemplary embodiment.

FIG. 1 illustrates in plane view part of a vehicle front section structure of a vehicle applied with a vehicle front section structure according to the present invention. Note that FIG. 1 illustrates the vehicle left front section; however, the vehicle front section structure according to the present invention may also be a structure with left-right symmetry thereto.

Front Side Member 12

As illustrated in FIG. 1, at the two vehicle width direction sides of a vehicle front section 10 there is a pair of left and right front side members 12, respectively provided with their length directions extending along the vehicle front-rear direction. Each front side member 12 is configured by a hollow rectangular closed cross-section structure formed by a front side outer member 16 disposed at the vehicle width direction outer side and a front side inner member 14 disposed at the vehicle width direction inner side. Moreover, a front end side 12A of each front side member 12 is slightly inclined toward the vehicle width direction outer side. A power unit 18 is provided between the pair of left and right front side members 12.

Gusset 20

As illustrated in FIG. 1 to FIG. 4, a gusset 20 that is substantially triangular shaped in plan view is attached to a side face at the vehicle width direction outer side of a front end portion 16A (see FIG. 2) of the front side outer member 16. The gusset 20 includes an upper wall 20A and a lower wall 20B formed in substantially triangular shapes in plan view, and a side wall 20C that links together vehicle width direction outer side end portions of the upper wall 20A and the lower wall 20B in the vehicle up-down direction. A recessed bead 22 is formed running along the length direction of the side wall 20C at a height direction intermediate portion of the side wall 20C. The side wall 20C thus has increased rigidity.

Figure 2:
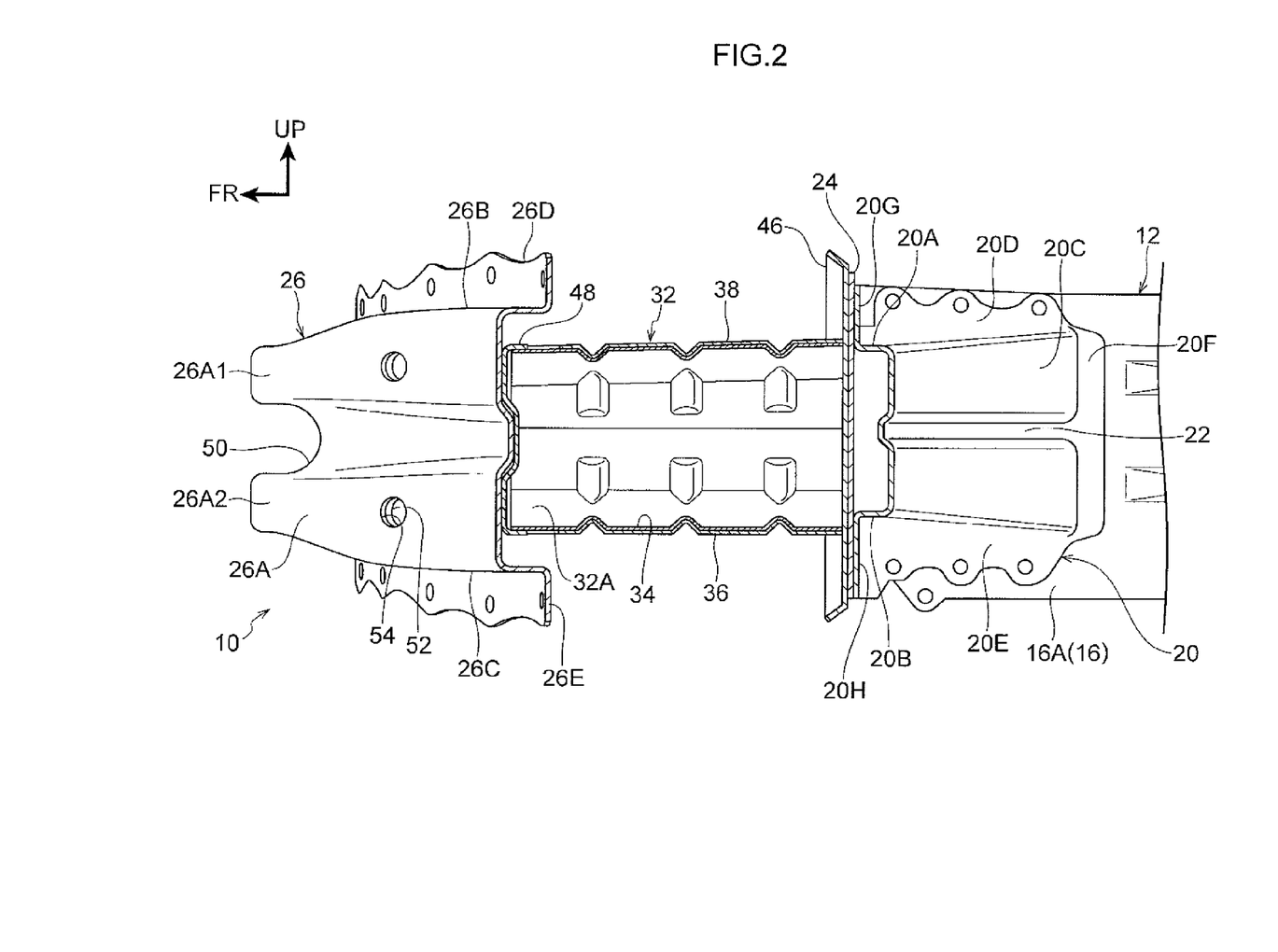
FIG. 2 is a vertical cross-section along line 2-2 of the vehicle front section structure illustrated in FIG. 1.

As illustrated in FIG. 2, a vehicle width direction inner side end portion of the upper wall 20A is bent toward the vehicle upper side to configure a first flange 20D. A vehicle width direction inner side end portion of the lower wall 20B is bent toward the vehicle lower side to configure a second flange 20E. A vehicle width direction inner side end portion of the side wall 20C is bent toward the vehicle rear side to configure a third flange 20F. The first flange 20D, second flange 20E, and third flange 20F are joined to the vehicle width direction outer side of the front end portion 16A of the front side outer member 16 by spot welding or the like.

A vehicle front side end portion of the upper wall 20A is bent toward the vehicle upper side to configure a fourth flange 20G. A vehicle front side end portion of the lower wall 20B is bent toward the vehicle lower side to configure a fifth flange 20H. A vehicle front side end portion of the side wall 20C is bent toward the vehicle width direction outer side to configure a sixth flange 20I (see FIG. 4). The fourth flange 20G, the fifth flange 20H, and the sixth flange 20I are joined to a first connection plate 24 by spot welding or the like.

As illustrated in FIG. 1, the first connection plate 24 is formed with a substantially rectangular flat plate shape, and has a size that covers a front end portion 12B of the right front side member 12 and a front end portion 20P of the gusset 20. The front end portion 12B of the front side member 12 and the front end portion 20P of the gusset 20 are joined to a rear face of the first connection plate 24.

Bumper Reinforcement 26

Bumper reinforcement 26 disposed with its length direction in the vehicle width direction is provided at the front end side of the vehicle front section 10. The bumper reinforcement 26 is configured by a central section 28 extending in a straight line along the vehicle width direction, and a pair of left and right vehicle width direction outer side sections 30 formed contiguously to both vehicle width direction sides of the central section 28. Other details of the bumper reinforcement 26 are described later.

Crash Box 32

Figure 3:
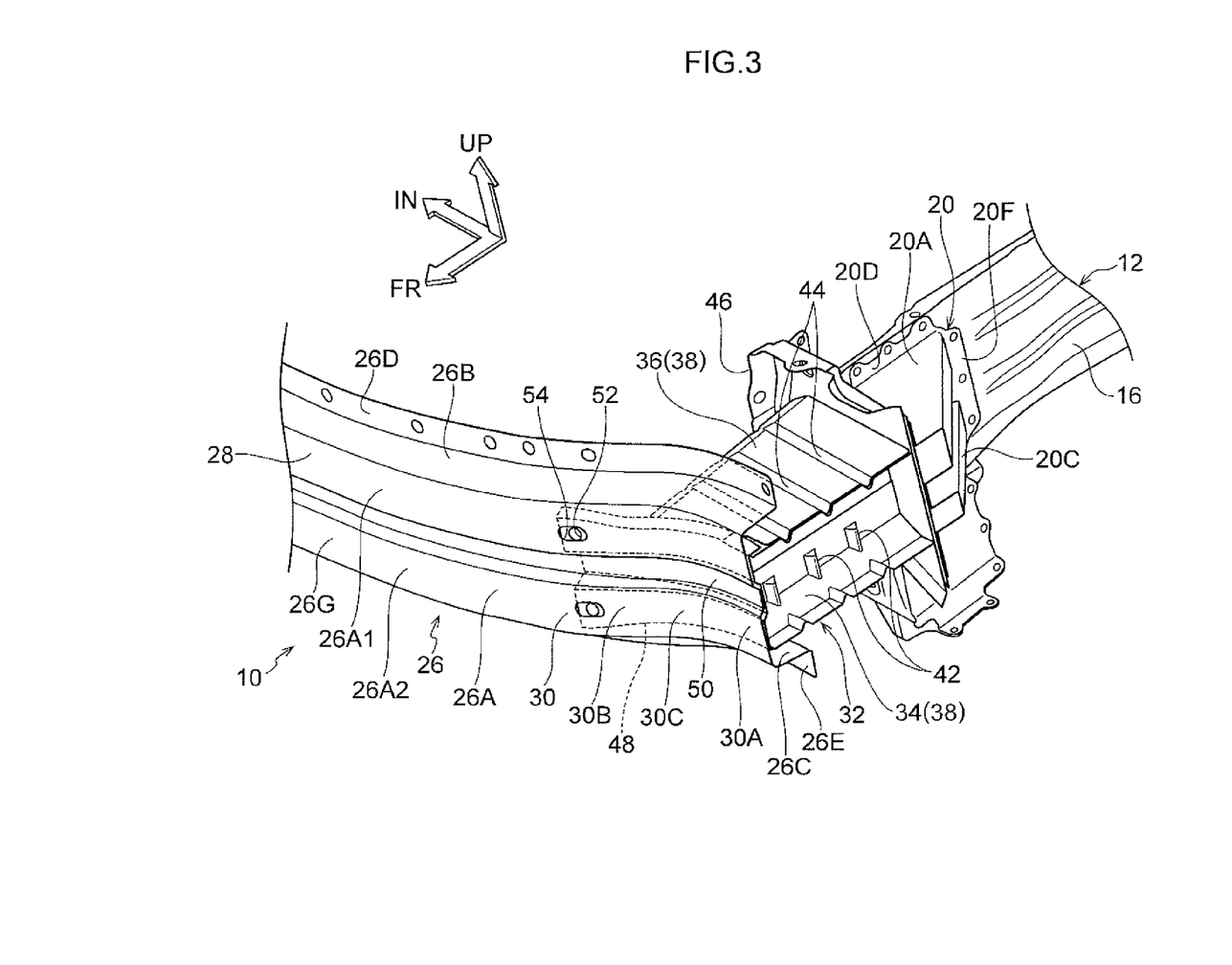
FIG. 3 is a perspective view of the vehicle front section structure illustrated in FIG. 2, in an assembled state as viewed obliquely from the upper side.
Figure 4:
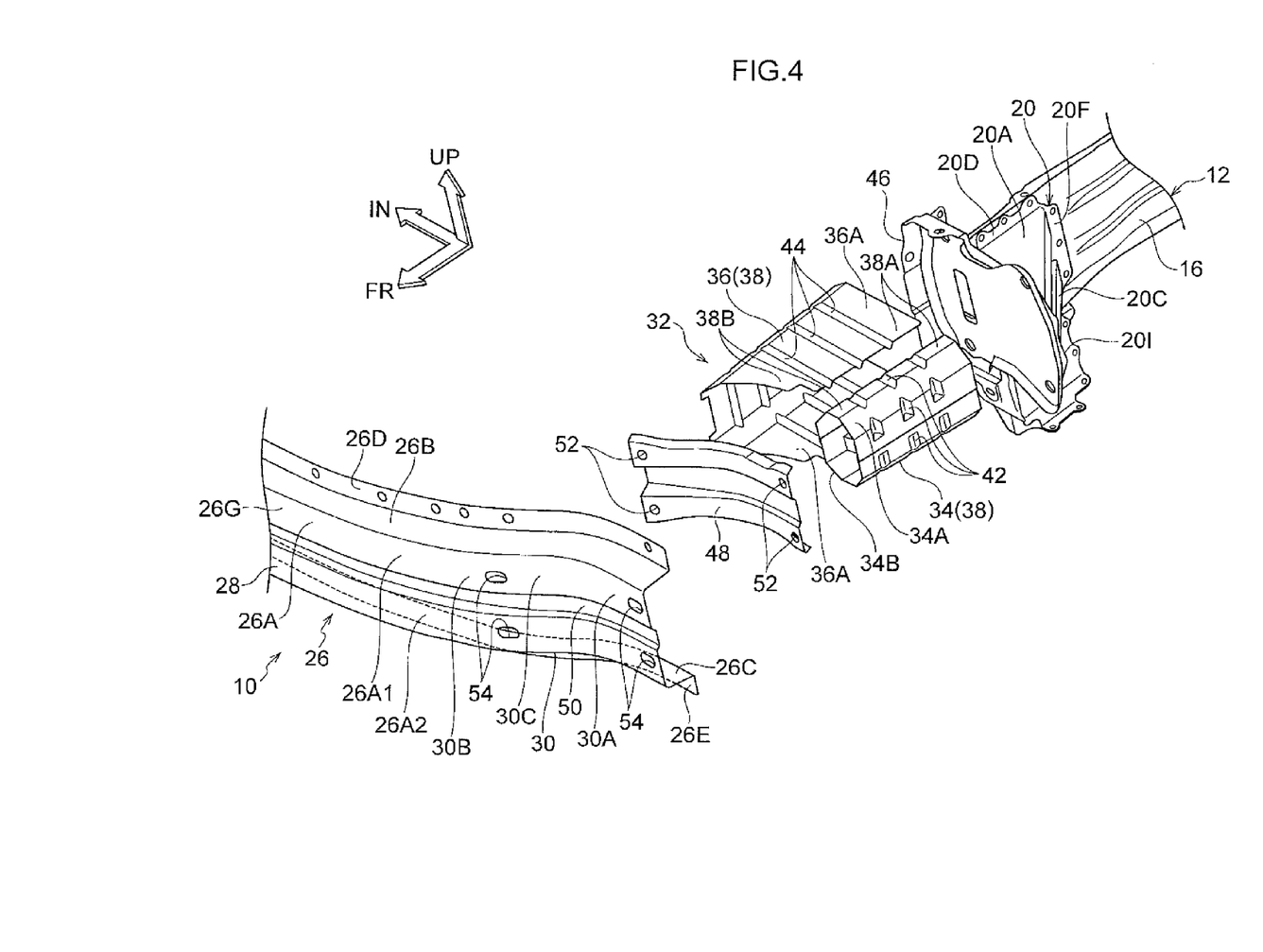
FIG. 4 is an exploded perspective view of the vehicle front section structure illustrated in FIG. 3.

As illustrated in FIG. 1 to FIG. 4, and in particular in FIG. 4, a tube shaped crash box 32 is disposed between the vehicle width direction outer side section 30 of the bumper reinforcement 26, and the front end portion 12B of the front side member 12 and the front end portion 20P of the gusset 20 described above. The crash box 32 is provided with a main body 38 configured by a first configuration member 34 having a closed cross-section structure and disposed at the vehicle width direction outer side, and a second configuration member 36 having an open cross-section and disposed at the vehicle width direction inner side. The first configuration member 34 is formed with an octagonal tube shape by welding together respective open-side end portions of an upper portion member 34A and a lower portion member 34B, which are respectively formed in substantially semi-circular tube shapes. The second configuration member 36 is formed in a substantially U shape open to the vehicle width direction outer side. The inside-half portion of the first configuration member 34 is disposed in a state inserted inside leading end portions of a pair of up and down side portions 36A of the second configuration member 36. The first configuration member 34 and the second configuration member 36 are integrated together by, in this state, welding both side portions 36A of the second configuration member 36 to the respective upper portion member 34A and the lower portion member 34B of the first configuration member 34. Note that, in vehicle plan view, a vehicle width direction inner side end portion 36B of the second configuration member 36 is inclined so as to run along the line of inclination of the front end side 12A of the front side member 12 toward the vehicle width direction outer side, and bears collision load from a barrier 40 further to the vehicle width direction outer side (see FIG. 1).

Plural recessed beads 42, 44 are integrally formed to the respective outer periphery of the first configuration member 34 and the outer periphery of the second configuration member 36. The plural recessed beads 42, 44 are formed at a specific spacing in the vehicle front-rear direction, and undergo compressive plastic deformation in the vehicle front-rear direction under collision load input toward the vehicle rear side.

Moreover, a second connection plate 46 is disposed at the rear end side of the main body 38 described above, and a third connection plate 48 is disposed at the front end side of the main body 38. The second connection plate 46 is formed in a substantially rectangular flat plate shape that is slightly larger than the first connection plate 24 and capable of covering a rear end portion 38A of the main body 38 from the vehicle rear side. The rear end portion 38A of the main body 38 is joined to the second connection plate 46 by welding or the like, and the second connection plate 46 and the first connection plate 24 are joined together by a joining means such as by nuts and bolts, not illustrated in the drawings. The front end portion 12B of the front side member 12 and the front end portion 20P of the gusset 20, are thereby integrated together with the crash box 32.

The third connection plate 48 has a size capable of covering a front end portion 38B of the main body 38 from the vehicle front side. The front end portion 38B of the main body 38 is joined to the third connection plate 48 by welding or the like, and the third connection plate 48 is joined to a front end wall 26A of the bumper reinforcement 26 by a joining method such as by nuts and bolts, not illustrated in the drawings. This is described later. A front end section 32A of the crash box 32 and the bumper reinforcement 26 are accordingly integrated together.

Configuration of Relevant Portions of the Vehicle Front Section Structure

As illustrated in FIG. 2 to FIG. 4, the bumper reinforcement 26 is formed with a hat shaped open cross-section profile open to the vehicle rear side. More specifically, the bumper reinforcement 26 is configured by the front end wall 26A extending along the vehicle width direction and the vehicle up-down direction, an upper wall 26B bent from an upper end portion of the front end wall 26A toward the vehicle rear side, a lower wall 26C bent from a lower end portion of the front end wall 26A toward the vehicle rear side, an upper flange 26D bent from a rear end portion of the upper wall 26B toward the vehicle upper side, and a lower flange 26E bent from a rear end portion of the lower wall 26C toward the vehicle lower side. The bumper reinforcement 26 is an integrally molded component configured by a single plate member. A recessed groove shaped bead 50 is formed spanning the entire vehicle width direction length of the bumper reinforcement 26 at a height direction intermediate portion of the front end wall 26A. An upper step portion 26A1 and a lower step portion 26A2 are thereby formed to the front end wall 26A with the bead 50 interposed therebetween, so as to increase the cross-sectional rigidity of the bumper reinforcement 26 of open cross-section structure.

The front end section 32A of the crash box 32, described above, is inserted into the interior of the cross-section of the bumper reinforcement 26 configured as described above. A circular bolt insertion hole 52 is formed at four corners of the third connection plate 48 configuring the front end of the crash box 32. Note that both the front end section 32A and the third connection plate 48 correspond to the "front end section of the crash box" of the present invention. Elongated holes 54 with their major axes in the vehicle width direction are accordingly formed in the upper step portion 26A1 and the lower step portion 26A2 of the front end wall 26A of the bumper reinforcement 26, at positions corresponding to the four bolt insertion holes 52. The third connection plate 48 is fastened and fixed to a back face of the front end wall 26A by nuts and bolts, not illustrated in the drawings, while adjusting the positioning between the circular bolt insertion holes 52 and the elongated holes 54.

As illustrated in FIG. 1, the bumper reinforcement 26 is configured by the vehicle width direction central section 28 and the pair of left and right vehicle width direction outer side sections 30 that are disposed on both sides of the central section 28. In vehicle plan view, the vehicle width direction outer side sections 30 are each configured by a flat portion 30A disposed at an end portion in the vehicle width direction outer side forming the outermost sides of the bumper reinforcement 26, a first curved portion 30B disposed separated further to the vehicle width direction inner side than the flat portion 30A, and a second curved portion 30C that is disposed between, and connects together, the flat portion 30A and the first curved portion 30B. The flat portion 30A, the first curved portion 30B, and the second curved portion 30C are integrally formed as part of the bumper reinforcement 26.

A front face 30A1 of the flat portion 30A extends in the vehicle width direction and the vehicle up-down direction, and is disposed parallel to a front face 26G of the front end wall 26A positioned at the central section 28 of the bumper reinforcement 26. The front face 30A1 of the flat portion 30A configures a contact face that contacts a straight section 40A of a barrier 40. Note that the barrier 40 is configured by the straight section 40A having a collision face extending in the vehicle width direction and the vehicle up-down direction, and corner sections 40B that are integrally formed to both ends of the straight section 40A and have collision faces that are circular arc faces of a specific radius of curvature.

As an example, in vehicle plan view, taking the starting end of the flat portion 30A as an intersection point P between the flat portion 30A and an extension line toward the vehicle front side of a vehicle width direction inner side side wall portion 34C of the first configuration member 34 of the crash box 32, the flat portion 30A extends further toward the vehicle width direction outer side than a vehicle width direction outer side side wall portion 34D of the first configuration member 34 of the crash box 32. Namely, the extension length of the flat portion 30A is determined such that the front face 30A1 of the flat portion 30A overlaps the vehicle width direction outer side side wall portion 34D of the first configuration member 34 of the crash box 32 when viewed face-on from the vehicle front.

The first curved portion 30B having a front face 30B1 curved in a shape bowing toward the vehicle front side, is disposed in the vehicle width direction outer side section 30 of the bumper reinforcement 26, described above, at a position separated further to the vehicle width direction inner side than the flat portion 30A in vehicle plan view. The second curved portion 30C that connects the flat portion 30A and the first curved portion 30B together is disposed in the vehicle width direction outer side section 30 of the bumper reinforcement 26 in vehicle plan view. A front face 30C1 of the second curved portion 30C is curved in a shape bowing substantially toward the vehicle rear side so as to lie either on an extension line E of the front face 30A1 of the flat portion 30A toward the vehicle width direction inner side, or at the vehicle front side of the extension line E. The radius of curvature of the front face 30C1 of the second curved portion 30C is set the same as, or slightly larger than, the radius of curvature of the corner sections 40B of the barrier 40. Namely, a front face of the vehicle width direction outer side section 30 of the bumper reinforcement 26 is configured by the flat front face 30A1, the concave curved face of the front face 30C1, and the convex curved face of the front face 30B1 that are linked together (continuous) in this sequence.

The third connection plate 48, which configures the front end portion of the front end section 32A of the crash box 32, described above, is formed with a shape following the shape of the front end wall 26A positioned at the vehicle width direction outer side section 30 of the bumper reinforcement 26 as viewed in vehicle plan view. The third connection plate 48 accordingly contacts the back face of the front end wall 26A positioned at the vehicle width direction outer side section 30 in a state of face-to-face contact, and is fastened and fixed thereto in this state.

Operation and Advantageous Effects of the Present Exemplary Embodiment

Explanation follows regarding operation and advantageous effects of the present exemplary embodiment.

As illustrated in FIG. 1, collision load from the barrier 40 is input to the vehicle width direction outer side end section 30 of the bumper reinforcement 26 in a small overlap collision.

In the present exemplary embodiment, the flat portion 30A is formed at the vehicle width direction outer side end section 30 of the bumper reinforcement 26, and the front face 30A1 of the flat portion 30A extends in the vehicle width direction and the vehicle up-down direction. Most of the collision load from the barrier 40 is thereby input to the flat portion 30A straight toward the vehicle front-rear direction rear side, and then also input to the crash box 32 straight toward the vehicle front-rear direction rear side. As a result, the crash box 32 undergoes compressive plastic deformation in the vehicle front-rear direction, and absorbs a specific amount of energy. Note that when this occurs, more of the collision load is transmitted to the first configuration member 34 side than to the second configuration member 36 of the crash box 32.

The collision load is transmitted to the gusset 20 after some of the energy of the collision load has been absorbed by the crash box 32. Note that when this occurs, a larger collision load is transmitted to the outer side than to the vehicle width direction inner side of the gusset 20. Thus a larger bending moment M acts on the front side member 12 through the gusset 20. As a result, the front side member 12 folds inward with a fold origin point at a rear end (point Q in FIG. 1) of the side wall 20C of the gusset 20. After folding inward, the front side member 12 presses a side section of the power unit 18 toward the vehicle width direction inner side. Lateral force is thereby generated on the vehicle in a direction away from the barrier 40, and the vehicle is thereby moved away from the barrier 40.

One sequence of operation in a small overlap collision is described above. Next, supplementary explanation follows regarding operation and advantageous effects of providing the flat portion 30A to the vehicle width direction outer side end section 30 of the bumper reinforcement 26.

Figure 5A:
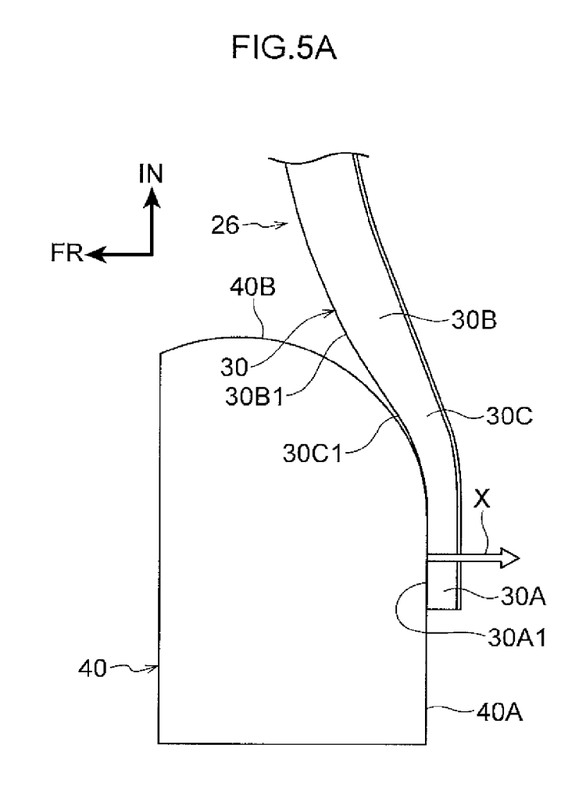
FIG. 5A is a schematic plan view illustrating an initial collision state of a vehicle applied with a front section structure according to the present exemplary embodiment collided with a barrier in a small overlap collision.
Figure 5B:
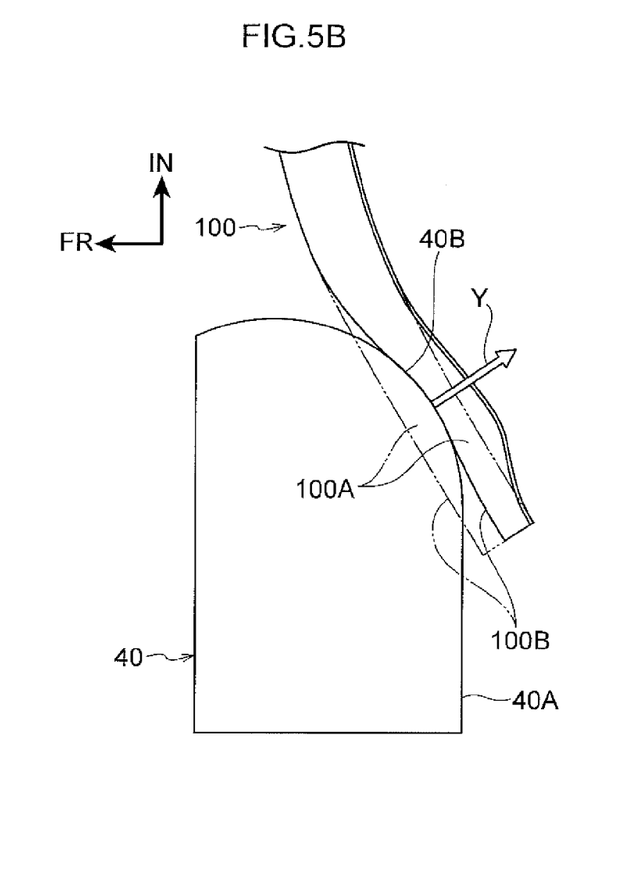
FIG. 5B is a schematic plan view illustrating an initial collision state of a vehicle applied with a front section structure according to a Comparative Example 1 collided with a barrier in a small overlap collision.

In cases in which, hypothetically, the shape of a front face 100B of a vehicle width direction outer side end section 100A of bumper reinforcement 100 is curved in a shape bowing toward the vehicle front side, as illustrated by the double-dotted intermittent line in FIG. 5B, the corner section 40B of the barrier 40 would collide with the curved front face 100B of the vehicle width direction outer side end section 100A of the bumper reinforcement 100 in a small overlap collision. Collision load would accordingly be input not toward the vehicle front-rear direction rear side, but rather, obliquely toward the vehicle rear inner side (the arrow Y direction). In such cases, it is conceivable that partway through collapsing, the crash box might collapse inward toward the vehicle width direction inner side. Note that upon inward collapse of the crash box, it is conceivable that the front side member, not illustrated in the drawings, might slip past the vehicle width direction inner side of the corner section 40B of the barrier 40.

However, as illustrated in FIG. 5A, in the present exemplary embodiment, the flat portion 30A is formed at the vehicle width direction outer side end section 30 of the bumper reinforcement 26 as described above. The straight section 40A of the barrier 40 thereby collides from a direction perpendicular to the surface of the flat portion 30A, and collision load from the barrier 40 is input straight toward the vehicle front-rear direction rear side. The crash box 32 is thereby less liable to collapse inward partway through collapsing. As a result, input force toward the gusset 20 during a small overlap collision can be raised at an early stage, such that inward folding of the front side member 12 can be achieved at an early stage.

The flat portion 30A is integrally formed at the end section of the vehicle width direction outer side 30 of the bumper reinforcement 26, such that the number of components does not increase. Accordingly, the load transmission path of the collision load is not made more complicated than in cases in which the flat portion 30A has been set as another component, and collision load can be quickly and efficiently transmitted to the gusset. Note that not increasing the number of components also contributes to cost reduction and vehicle weight reduction.

As explained above, in a small overlap collision, the vehicle front section structure according to the present exemplary embodiment is capable of transmitting collision load quickly and efficiently to the gusset 20, and moreover prevents the front side member 12 from slipping past the barrier 40 due to inward collapse of the crash box 32, thereby enabling the front side member 12 to be folded inward at an early stage.

Moreover, in the present exemplary embodiment, the first curved portion 30B is formed at the vehicle width direction outer side section 30 of the bumper reinforcement 26 and further to the vehicle width direction inner side than the flat portion 30A in vehicle plan view, with the front face 30B1 curved in a shape bowing toward the vehicle front side on progression toward the central section 28 of the bumper reinforcement 26. The central section 28 of the bumper reinforcement 26 is thereby capable of being disposed toward the vehicle front-rear direction front side (placed forward) by the amount by which the first curved portion 30B is curved. This thereby enables a crush stroke S (namely, a distance from the front face 26G of the central section 28 of the bumper reinforcement 26 to as far as the rear end face of the crash box 32) to be lengthened in a full overlap front-on collision (in a head-on collision). Namely, forming the first curved portion 30B enables the central section 28 of the bumper reinforcement 26 to be disposed further toward the vehicle front side, and the timing at which the front face 26G of the front end wall 26A positioned at the central section 28 of the bumper reinforcement 26 contacts the barrier 40 in a full overlap front-on collision is made earlier by an equivalent amount. The crash box 32 starts to undergo compressive plastic deformation at the point in time at which the barrier 40 has contacted the front face 26G of the front end wall 26A positioned at the central section 28 of the bumper reinforcement 26. As a result, the present exemplary embodiment enables the crash box 32 to be caused to quickly absorb energy during a full overlap front-on collision. In other words, the present exemplary embodiment enables both earlier inward folding of the front side member 12 in a small overlap collision, and an improvement to energy absorption performance by the crash box 32 in a full overlap front-on collision, to be achieved.

Moreover, in the present exemplary embodiment, the second curved portion 30C curved in a shape bowing substantially toward the vehicle rear side is disposed between the flat portion 30A and the first curved portion 30B and connects the flat portion 30A and the first curved portion 30B together. Accordingly, forward placement of the central section 28 of the bumper reinforcement 26 can be achieved to the maximum extent by using the first curved portion 30B, while avoiding contact with the corner sections 40B of the barrier 40 as much as possible at the collision start time in a small overlap collision. Thus, more of the collision load input amount from the barrier 40 can be input to the flat portion 30A, and the crush stroke S described above can be secured as long as possible. As a result, the present exemplary embodiment enables the amount of load input from the barrier 40 toward the flat portion 30A in a small overlap collision to be increased such that the front side member 12 can be caused to fold inward at an early stage, and enables the energy absorption performance to be further improved in a full overlap front-on collision. Note that the reason the curved shape bowing substantially toward the vehicle rear side of the front face 30C1 of the second curved portion 30C is set so as to lie on the extension line E of the front face 30A1 of the flat portion 30A, or at the vehicle front side of the extension line E, is that, were the front face 30C1 to cross over the extension line E and curve in a shape bowing substantially toward the vehicle rear side, then the second curved portion 30C would encroach into the front end section of the crash box 32. This would hinder the performance originally demanded from the crash box 32 (to use the first configuration member 34 side to bear more of the collision load that has been input from the flat portion 30A toward the vehicle front-rear direction rear side and to transmit more of the collision load to the gusset 20, and to cause the front side member 12 to fold inward about the fold origin point Q at an early stage).

In the present exemplary embodiment, the crash box 32 is disposed so as to overlap both the flat portion 30A and the first curved portion 30B as viewed face-on from the vehicle front. The third connection plate 48 that configures a front end portion of the front end section 32A of the crash box 32 has a shape following the flat portion 30A and the first curved portion 30B at the vehicle width direction outer side section 30 of the bumper reinforcement 26 such that at least the vehicle width direction inner side portion of the crash box 32 extends out toward the vehicle front side. As a result, the present exemplary embodiment enables the amount of energy that can be absorbed by the crash box 32 to be increased during a front-on collision (either in a small overlap collision or in a full overlap front-on collision).

In the present exemplary embodiment, the bumper reinforcement 26 is configured by an open cross-section profile open to the vehicle rear side, and the front end section 32A of the crash box 32 is inserted into the interior of the cross-section of the bumper reinforcement 26. Additionally, the third connection plate 48 at the front end section 32A of the crash box 32 has a shape following the front end wall 26A for positioning the flat portion 30A and the first curved portion 30B of the vehicle width direction outer side section 30 of the bumper reinforcement 26. The length of the crash box 32 in the vehicle front-rear direction is accordingly lengthened by the inserted amount of the crash box 32. As a result, the present exemplary embodiment enables the amount of energy that can be absorbed by the crash box 32 in a head-on collision to be increased even further.

Figure 6A:
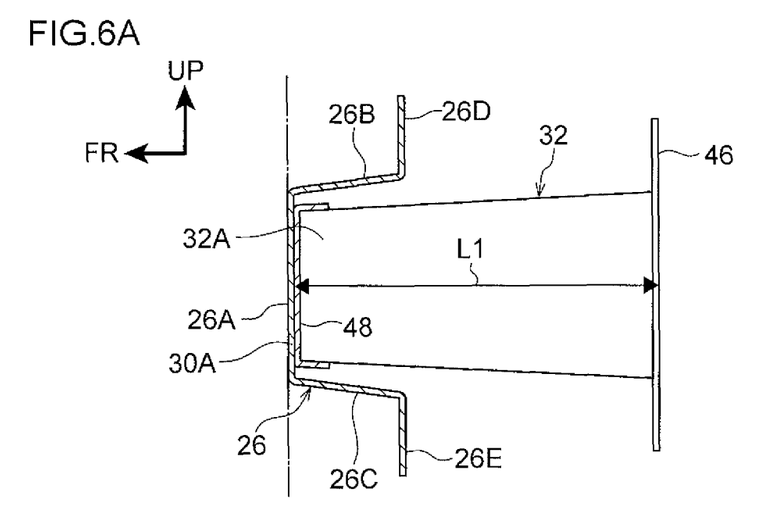
FIG. 6A is a vertical cross-section along line 6A-6A in FIG. 1.
Figure 6B:
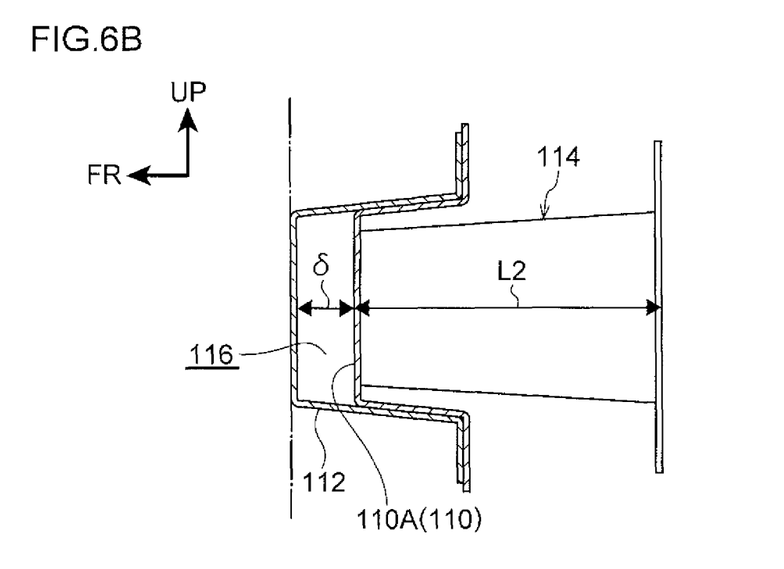
FIG. 6B is vertical cross-section sectioned along the same position as in FIG. 6A for a vehicle applied with a vehicle front section structure according to a Comparative Example 2.

Supplementary explanation to this follows with reference to FIG. 6A to FIG. 6B. As illustrated in FIG. 6B, in a hypothetical case of a structure of a different-body gusset 112, having a front face configured by a flat face extending in the vehicle width direction and the vehicle up-down direction and having a vertical cross-section profile configured by a hat shape, being fitted to a vehicle width direction outer side end section 110A of bumper reinforcement 110, the length (crash box length) along the vehicle front-rear direction of a crash box 114 would be L2. In contrast, as illustrated in FIG. 6A, in the vehicle front section structure according to the present exemplary embodiment, the flat portion 30A is integrally formed at the vehicle width direction outer side end section of the bumper reinforcement 26, and the bumper reinforcement 26 is formed with an open cross-section profile that is open to the vehicle rear side. The front end section 32A of the crash box 32 can thereby be inserted into the interior of the cross-section of the bumper reinforcement 26 and fixed thereto. In such cases, the crash box length of the crash box 32 is L1, and the crash box length is lengthened by an amount δ more than that of the case of the vehicle front section structure illustrated in FIG. 6B. In other words, in the case of the vehicle front section structure illustrated in FIG. 6B, a gap 116 is formed between the different-body gusset 112 and the vehicle width direction outer side end section 110A of the bumper reinforcement 110, such that the crash box length of the crash box 114 is shortened by the amount of the front-rear length δ of the gap 116. However, in the case of the vehicle front section structure according to the present exemplary embodiment illustrated in FIG. 6A, the gap 116 is not formed, and so the crash box length L1 of the crash box 32 can be lengthened by an amount δ. As a result, the amount of energy that can be absorbed by the crash box 32 is increased.

Supplementary Exemplary Embodiments

Explanation has been given employing a bumper reinforcement 26 with an open cross-section structure in the present exemplary embodiment described above. However, there is no limitation thereto, and for example, bumper reinforcement with a hollow, rectangular closed cross-section structure may be employed. In such cases, the front end section of the crash box is joined to a rear wall section of the bumper reinforcement having a hollow, rectangular, closed cross-section structure.

In the present exemplary embodiment described above, the flat portion 30A exceeds the vehicle width direction outer side side wall portion 34D of the first configuration member 34 of the crash box 32 and juts out to the vehicle width direction outer side. However, there is no limitation thereto. The vehicle width direction outer side end portion of the flat portion may be configured so as to match the vehicle width direction outer side end portion of the first configuration member of the crash box, so as not to jut out from the end portion.

In the present exemplary embodiment described above, the second curved portion 30C was set between the flat portion 30A and the first curved portion 30B. However, the second curved portion 30C is not always necessary. For example, a configuration may be adopted in which, in vehicle plan view, the flat portion is extended toward the vehicle width direction inner side, and the flat portion and the curved portion are directly connected together. Moreover, a configuration may be adopted in which, in vehicle plan view, the vehicle width direction inner side end portion of the flat portion and the vehicle width direction outer side end portion of the first curved portion are connected to an inclined face passing through a tangent line of the corner section of the barrier or an inclined face which is parallel to the tangent line.

What is claimed is:

1. A vehicle front section structure, comprising:
   a front side member that is disposed at a vehicle width direction outer side of a vehicle body front section, and that extends with its length direction in a vehicle front-rear direction;
   a gusset that juts out from a side face at a vehicle width direction outer side of a front end portion of the front side member toward the vehicle width direction outer side;
   a bumper reinforcement that is disposed at a front end side of the vehicle body front section with its length direction in a vehicle width direction; and
   a crash box that is disposed between front end portions of both the front side member and the gusset, and an outer side section in the vehicle width direction of the bumper reinforcement, that couples both of the front end portions and the outer side section together in the vehicle front-rear direction, and that has a tube shape which undergoes compressive plastic deformation in the vehicle front-rear direction due to collision load input toward a vehicle rear side,
   wherein a flat portion is integrally formed at an end section of the bumper reinforcement at the vehicle width direction outer side, with a front face of the flat portion extending along the vehicle width direction and a vehicle up-down direction and, in vehicle front view, overlapping with a side wall portion at the vehicle width direction outer side of the crash box,
   wherein a first curved portion is formed at the outer side section in the vehicle width direction of the bumper reinforcement, further to a vehicle width direction inner side than the flat portion in vehicle plan view, with a front face of the first curved portion curved in a shape bowing toward a vehicle front side on progression toward a central section of the bumper reinforcement,
   wherein the crash box is disposed overlapping with both the flat portion and the first curved portion in vehicle front view, and
   wherein a front end section of the crash box has a shape following the flat portion and the first curved portion.

2. The vehicle front section structure of claim 1, wherein:
   the first curved portion is disposed at the outer side section in the vehicle width direction of the bumper reinforcement, separated from the flat portion to the vehicle width direction inner side; and
   a second curved portion is disposed at the outer side section in the vehicle width direction of the bumper reinforcement, between the flat portion and the first curved portion in vehicle plan view, and connecting the flat portion and the first curved portion together, with a front face of the second curved portion curved in a shape bowing substantially toward the vehicle rear side so as to lie on an extension line of the front face of the flat portion toward the vehicle width direction inner side or at a vehicle front side of the extension line.

3. The vehicle front section structure of claim 1, wherein:
   the bumper reinforcement is provided with a front end wall, an upper wall, and a lower wall, and is formed with an open cross-section profile open to the vehicle rear side; and
   the front end section of the crash box is inserted into the interior of the cross-section of the bumper reinforcement, and the front end section of the crash box has a shape following a front end wall of the flat portion and the first curved portion.

* * * * *